US009447846B2

(12) United States Patent
Li et al.

(10) Patent No.: US 9,447,846 B2
(45) Date of Patent: Sep. 20, 2016

(54) SUSPENDED WHEEL REDUCER

(71) Applicants: Jianli Li, Xi'an, Shaanxi (CN); Wei Deng, Xi'an, Shaanxi (CN)

(72) Inventors: Jianli Li, Xi'an (CN); Wei Deng, Xi'an (CN); Jiangyan Sun, Xi'an (CN); Jiying Zhao, Xi'an (CN)

(73) Assignees: Jianli Li (CN); Wei Deng (CN)

( * ) Notice: Subject to any disclaimer, the term of this patent is extended or adjusted under 35 U.S.C. 154(b) by 0 days.

(21) Appl. No.: 14/397,887

(22) PCT Filed: Mar. 8, 2013

(86) PCT No.: PCT/CN2013/072346
§ 371 (c)(1),
(2) Date: Oct. 30, 2014

(87) PCT Pub. No.: WO2014/134822
PCT Pub. Date: Sep. 12, 2014

(65) Prior Publication Data
US 2015/0126323 A1    May 7, 2015

(51) Int. Cl.
*F16H 1/46* (2006.01)
*F16H 3/44* (2006.01)

(52) U.S. Cl.
CPC . *F16H 1/46* (2013.01); *F16H 3/44* (2013.01)

(58) Field of Classification Search
CPC .... F16H 1/46; F16H 2001/289; F16H 55/17; F16H 2055/176
See application file for complete search history.

(56) References Cited

U.S. PATENT DOCUMENTS 3,796,483 A * 3/1974 Sakaguchi et al. ........... 352/172
5,845,732 A    12/1998 Taniguchi et al.
2006/0276287 A1    12/2006 Lang et al.
2007/0272458 A1 * 11/2007 Taniguchi et al. ........... 180/65.5
2009/0233754 A1    9/2009 Pedersen
2010/0120574 A1 * 5/2010 Maekawa ..................... 475/331
2011/0275477 A1    11/2011 Hsieh et al.

(Continued)

FOREIGN PATENT DOCUMENTS

CN         1317653 A     10/2001
CN       101171442 A      4/2008

(Continued)

OTHER PUBLICATIONS

International Search Report mailed Dec. 19, 2013, in corresponding International Application No. PCT/CN2013/072346.
International Search Report mailed Dec. 19, 2013 in International Application No. PCT/CN2013/072346, filed Mar. 8, 2013.

(Continued)

Primary Examiner — Huan Le
(74) Attorney, Agent, or Firm — Hauptman Ham, LLP

(57) ABSTRACT

The present invention provides a Suspended Wheel Reducer and a suspended wheel crossing-zero multilevel transmission, both of which comprise a front planetary gear train, a rear planetary gear train and a suspended wheel. With different design for the dimension of the gear wheels contained in the front planetary gear train, the rear planetary gear train and the suspended wheel, it's possible to achieve optional different reduction ratios. The Suspended Wheel Reducer and the suspended wheel crossing-zero multilevel transmission have simple configuration, higher reliability, thus overcoming the drawback in prior art, in which a transmission mechanism for multilevel gear shift mechanism is required to achieve greater reduction ratio, reducing its overall dimensions and cost.

4 Claims, 2 Drawing Sheets

(56) References Cited

U.S. PATENT DOCUMENTS

| | | |
|---|---|---|
| 2012/0015771 A1 | 1/2012 | Haeusler |
| 2012/0315167 A1* | 12/2012 | Williams ................. 417/415 |
| 2013/0237368 A1* | 9/2013 | Zhang et al. ............. 475/337 |

FOREIGN PATENT DOCUMENTS

| | | |
|---|---|---|
| CN | 102235470 A | 11/2011 |
| CN | 102777554 A | 11/2012 |
| DE | 19516632 A1 | 11/1996 |
| DE | 102004058032 A1 | 6/2006 |
| GB | 1436491 A | 5/1976 |
| JP | 61-282650 A | 12/1986 |
| JP | 2-245543 A | 10/1990 |
| JP | 8-282314 A | 10/1996 |
| JP | 2001-330085 A | 11/2001 |
| JP | 2006-525160 A | 11/2006 |
| JP | 2011031792 A | 2/2011 |
| KR | 20110137333 A | 12/2011 |
| TW | 201017008 A | 5/2010 |
| WO | WO2008/136211 | 11/2008 |

OTHER PUBLICATIONS

Written Opinion mailed Dec. 19, 2013 in International Application No. PCT/CN2013/072346, filed Mar. 8, 2013.
International Preliminary Report of Patentability mailed Dec. 19, 2013 in International Application No. PCT/CN2013/072346, filed Mar. 8, 2013.
Japanese Office Action issued on Apr. 7, 2015, by the Japanese Patent Office in the corresponding Japanese Application No. 2015-503734.
Korea Official Action mailed on Feb. 11, 2015, by the Korean Intellectual Property Office in the corresponding Korea Application No. 10-2014-7027199.
Korea Official Action mailed on Apr. 29, 2015, by the Korean Intellectual Property Office in the corresponding Korea Application No. 10-2014-7027199.
Partial European Search Report dated Jun. 10, 2015, issued in the corresponding European Application No. 13877253.8.
Extended European Search Report dated Oct. 26, 2015 from corresponding application No. EP 13877253.8.
Rejection Decision dated Jan. 12, 2016 and English translation from corresponding No. JP 2015-503734.

* cited by examiner

SUSPENDED WHEEL REDUCER

RELATED APPLICATIONS

The present application is a National Phase of International Application Number PCT/CN2013/072346, filed Mar. 8, 2013.

BACKGROUND

The present invention relates to the field of reducer, and especially to a Suspended Wheel Reducer based on the configuration of a planetary gear train mechanism.

The reducer is a typical gearing transmission device as the basic part commonly used for mechanical transmission, the transmission reliability, transmission ratio and dimensions thereof and so on determine the reliability, transmission efficiency as well as overall dimensions of the equipment using the reducer. In terms of the field of a gear wheel, the reducer and the gearshift etc. are all belong to the configuration domain of the gear box, and as focal point of developing new techniques for the gear transmission in recent years, the gear box has been improved toward high reliability and light weight.

Presently, there are three trends as follows about technical research for the gear box at our country and abroad:

1. Development of light materials and improvement of the thermal processing technology. For example, high-quality alloy steel is developed and employed, the hardening and tempering technology for the gear is regulated and improved, and the most typical technological progress is the proposition of hard tooth surface technology and the sustainable development of the hardening and tempering technology. However, the limitation for such a technology is that applying this technology would increase its cost for raw materials, and as to traditional manufacturing of the gear box, beneficial result can be caused only when the profit obtained from reducing the weight of a gear box is greater than its cost outgoing.

2. Development of the method of the fine designing and precise manufactures, such as strength calculation, analyses of high reliability and the like. However, the designing and manufacturing technologies for various gear boxes have been applied rather prevalently and maturely at our country and abroad, especially during recent few decades years, engineers from nations of the world have made elaborate design of various reducers and gearshifts and renewed the products for many times, such that the conventional design of the gear box has tend to be even more rightful and perfect, thus even with presently advanced computer design software, there still exist an extremely small space for further refining improvement of the gear box, and the effect would be highly limited when considering optimizing the design of the existing configuration.

3. Innovation of the gear transmission formation and transmission principle express the variation about the transmission configuration. In comparison with the above two research trends, this technological progress is even more thorough and advanced. In this regard, any technological progress sufficiently proven by the practice would provide fundamental technical support for the upgrade and renewal of the gear transmission. For example, the innovation made on basis of the planetary wheel configuration during recent few decades has brought about several novel gear boxes of high reduction ratio, such as "Cycloidal Pinwheel Reducer", "Harmonic gear Reducer", "Three-ring Reducer" and so on, which, comparing with traditional cylindrical gear reduction box, comprise the advantages of compactness, compact conformation, being light in weight etc and thus have find wide use.

With conventional gear reducer, higher reduction ratio always requires mutual cooperation among multilevel gear sets so as to reach desirable velocity ratio, which leads to many problems for the reduction box of higher velocity ratio, such as complicated configuration, greater volume and weight, and higher cost etc. Some special type reducer having greater reduction ratios employ innovative gear transmission principle to reduce the volume and weight thereof, such as the afore-mentioned "Harmonic gear Reducer" and the like. However, a particular flexible inner gear ring is introduced in such kind of structural elements for the gear wheel, and such flexible inner gear ring does not have high reliability, which is distinct to the conventional mechanical elements, the reliability of which has been verified during nearly hundred years practice. Corresponding side effect is that such a special type of flexible inner gear ring configuration makes the production process to be complicated, increases the manufacturing cost in a certain extent, while the reliability and maintainability descend on the contrary.

SUMMARY

The object of the present invention is to overcome the above problems in prior art, to provide a suspended wheel reducer having rightful configuration, usableness, lower manufacturing cost, higher reliability and facilitating the electromechanical integration automated control.

The technical solution of the suspended wheel reducer provided by the present invention is as follows: a suspended wheel reducer comprising a front planetary gear train, a rear planetary gear train and a suspended wheel, wherein the front planetary gear train is composed of a front sun wheel, a front planetary wheel and a front inner gear ring, the rear planetary gear train is composed of a rear sun wheel, a rear planetary wheel and a rear inner gear ring, the front inner gear ring and the rear inner gear ring are shaped at the inner peripheral surface of the suspended wheel and integral with the suspended wheel, the wheel centers of the front sun wheel and the rear sun wheel are rigidly coupled with each other through a power input shaft, the front sun wheel is transmissively coupled with the front inner gear ring through the front planetary wheel, and the rear sun wheel is transmissively coupled with the rear inner gear ring through the rear planetary wheel, the front planetary wheel rotates around the fixed rotating shaft, and the wheel center of the rear planetary wheel is connected to the power output shaft for outputting power.

Preferably, a connecting tie rod for connecting the power output shaft is provided at the wheel center of the rear planetary wheel.

The suspended wheel herein is integrally molded with a front inner gear ring and a rear inner gear ring at its inner peripheral surface, the front inner gear ring and rear inner gear ring are preferably rigid inner gear rings. According to the structural design of the suspended wheel reducer of the present invention, through the front inner gear ring and rear inner gear ring integrally molded with the suspended wheel, the suspended wheel may suspended at the design position without any support, i.e., the suspended wheel 1 will move with load at the peripheries of the front planetary wheel and rear planetary wheel, and is thus called "suspended wheel".

The suspended wheel reducer according to the present invention provides a novel gear transmission configuration, which allows for optional different reduction ratios by different dimensional design of the front, rear planetary gear trains and the suspended wheel. The suspended wheel reducer has simple configuration, higher reliability, thus overcoming the drawback in prior art, in which a transmission mechanism for multilevel gear shift is required to achieve greater reduction ratio, reducing its overall dimensions and cost.

In the suspended wheel reducer according to the present invention, if each set of the three sets of gear wheels, i.e., the front sun wheel and rear sun gear, the front planetary wheel and rear planetary wheel as well as the front inner gear ring and rear inner gear ring, is designed to have the same size, that is to say, the front sun wheel and the rear sun gear are consistent in their tooth number and modulus, the front planetary wheel and rear planetary wheel are consistent in their tooth number and modulus, and the front inner gear ring and rear inner gear ring are consistent in their tooth number and modulus, its possible to allow the power output shaft connected with the connecting tie rod to have zero rotational speed and torque regardless of the rotating speed input by the power input shaft.

Preferably, the pitch circles of the front sun wheel and rear sun wheel have identical dimensions, and/or the pitch circles of the front planetary wheel and rear planetary wheel have identical dimensions, and/or the pitch circles of the front inner gear ring and rear inner gear ring have identical dimensions.

Preferably, the pitch circles of the front sun wheel and the rear sun wheel are distinct in their dimensions, and/or the pitch circles of the front planetary wheel and the rear planetary wheel are distinct in their dimensions, and/or the pitch circles of the front inner gear ring and the rear inner gear ring are distinct in their dimensions.

Preferably, the pitch circles of the front sun wheel and the rear sun wheel have different dimensions, the ratio thereof is 1.0001~1000:1 or 1:1.0001~1000.

Preferably, the pitch circles of the front planetary wheel and the rear planetary wheel have different dimensions, the ratio thereof is 1.0001~1000:1 or 1:1.0001~1000.

Preferably, the pitch circles of the front inner gear ring and the rear inner gear ring have different dimensions, the ratio thereof is 1.0001~1000:1 or 1:1.0001~1000.

By arrangement of the dimension of the pitch circles of the front sun wheel and rear sun gear, the dimension of the pitch circles of the front planetary wheel and rear planetary wheel as well as the dimension of the pitch circles of the front inner gear ring and rear inner gear ring, it's possible to make fore and aft two sets of planetary gear trains to have different rotating speeds based on the required reduction ratio, such that its possible to achieve diversified variation for the rotating speed of the power input shaft and the power output shaft, so as to obtain a reducer providing different reduction ratios.

Preferably, the number of the front planetary wheel and/or the rear planetary wheel is three.

Preferably, the teeth for the front, rear planetary wheels and the corresponding front, rear inner gear rings are skewed teeth, and the skewed teeth of the front, rear planetary wheels and the corresponding the skewed teeth of front, rear inner gear rings have opposite rotating direction.

The skewed teeth of the front, rear planetary wheels and the skewed teeth of the corresponding front, rear inner gear rings have opposite handedness, so that it's possible to limit the axial motion of the suspended wheel.

Preferably, the teeth of the front, rear planetary wheels and the teeth of the corresponding front, rear inner gear rings are herringbone teeth.

The teeth of the front, rear planetary wheels and the teeth of the corresponding front, rear inner gear rings are herringbone teeth, so that it's also possible to limit the axial motion of the suspended wheel.

Preferably, the suspended wheel is equipped with a sliding bearing or rolling bearing for preventing its axial movement. The sliding bearing or rolling bearing may be assembled onto the outer periphery of the suspended wheel, things may also be that a part of the inner peripheral surface of the suspended wheel extends radially toward the power input shaft and the sliding bearing or rolling bearing are assembled between the power input shaft and the radially extending part of the suspended wheel, so as to limit the axial motion of the suspended wheel. Naturally, it's also possible for the sliding bearing or rolling bearing to be assembled onto the suspended wheel at any position where it's possible to limit the axial movement of the suspended wheel.

The sliding bearing is used herein to limit the axial movement of the suspended wheel.

With the suspended wheel reducer according to the present invention, the more the running speeds of the front planetary gear train and rear planetary gear train are similar to each other, the greater the reduction ratio and the torque of the suspended wheel reducer are; while the more the running speeds of the front planetary gear train and rear planetary gear train are different from each other, the less the reduction ratio of the suspended wheel reducer is, and the torque is also decreased correspondingly. In prior art, when various traditional reducers desire to increase reduction ratio on the basis of original configuration, such an object of increasing the reduction ratio can only be achieved through increasing the quantity of the gear wheels, shafts of the reducer, and altering and enlarging the gear box and similar parts so as to create a two or more stage configuration. However, the suspended wheel reducer provided by the present invention can obtain a reducer of optional reduction ratios, such as 30:1 . . . , 300:1 . . . , 3000:1 . . . , 10000:1 . . . , by means of the limited number of gear wheels and shafts in the front planetary gear train and rear planetary gear train. Further, the gear wheels, shafts and similar parts used in the suspended wheel reducer are mechanical structural elements proven during almost centennial production and practice, therefore, the suspended wheel reducer of the present invention obtains fantastic improvement at many aspects, such as the whole set performance, reliability, modularization of the production standard, the simplification and light weight of the whole set configuration, the standardization of the production process and maintainability and so on.

According to another embodiment of the present invention, there provides a suspended wheel crossing-zero multilevel transmission comprising a front planetary gear train, a rear planetary gear train and a suspended wheel, wherein the front planetary gear train is composed of one multilevel gear shift mechanism, the rear planetary gear train is composed of a rear sun wheel, a rear planetary wheel and a rear inner gear ring, the rear inner gear ring is shaped at the inner peripheral surface of the suspended wheel and integral with the suspended wheel, the multilevel gear shift mechanism comprise one input gear wheel, a plurality of sets of output gear wheels and a front inner gear ring, the input gear wheel engages with one set of the plurality of sets of the output gear wheels, the input gear wheel is transmissively coupled with the front inner gear ring through the set of the output gear wheel, and the rear sun wheel is transmissively coupled with the rear inner gear ring through the rear planetary wheel, the wheel centers of the rear sun wheel and the input gear wheel are rigidly coupled with the power input shaft, and the wheel center of the rear planetary wheel is coupled with the power output shaft for outputting power, the reduction ratio of one set of the plurality of sets of output gear wheels to the input gear wheel is identical to the reduction ratio of the rear planetary wheel to the rear sun wheel.

Preferably, a connecting tie rod for connecting the power output shaft is provided at the wheel center of the rear planetary wheel.

Preferably, the multilevel gear shift mechanism is a gear shift mechanism of 3~30 levels.

Preferably, the reduction ratio of one set of the plurality of sets of output gear wheels to the input gear wheel and the reduction ratio of the rear planetary wheel to the rear sun wheel have a ratio of 1.0001~1000:1 or 1:1.0001~1000.

With the suspended wheel crossing-zero multilevel transmission according to the present invention, it's provided for such an effect that the output rotating speed of the power output shaft is zero regardless of the input rotating speed of the power input shaft, and such an effect may be achieved when the input gear wheel is engaged with the set of output gear wheel of the plurality of sets of output gear wheels the reduction ratio of which to the input gear wheel is identical to the reduction ratio of the rear planetary wheel to the rear sun gear. When the input gear wheel engages other sets of the output gear wheels, different reduction ratios can be achieved for the entirety of the suspended wheel crossing-zero multilevel transmission, which also has the advantages similar to that of the suspended wheel reducer according to another embodiment of the present invention, detailed description thereof is omitted here.

BRIEF DESCRIPTION OF THE DRAWINGS

Further advantages and characteristics of the present invention will become even more apparent from the following specific embodiments of the present invention given only by way of non-limiting examples and illustrated in the drawings, in which.

Figure 1:
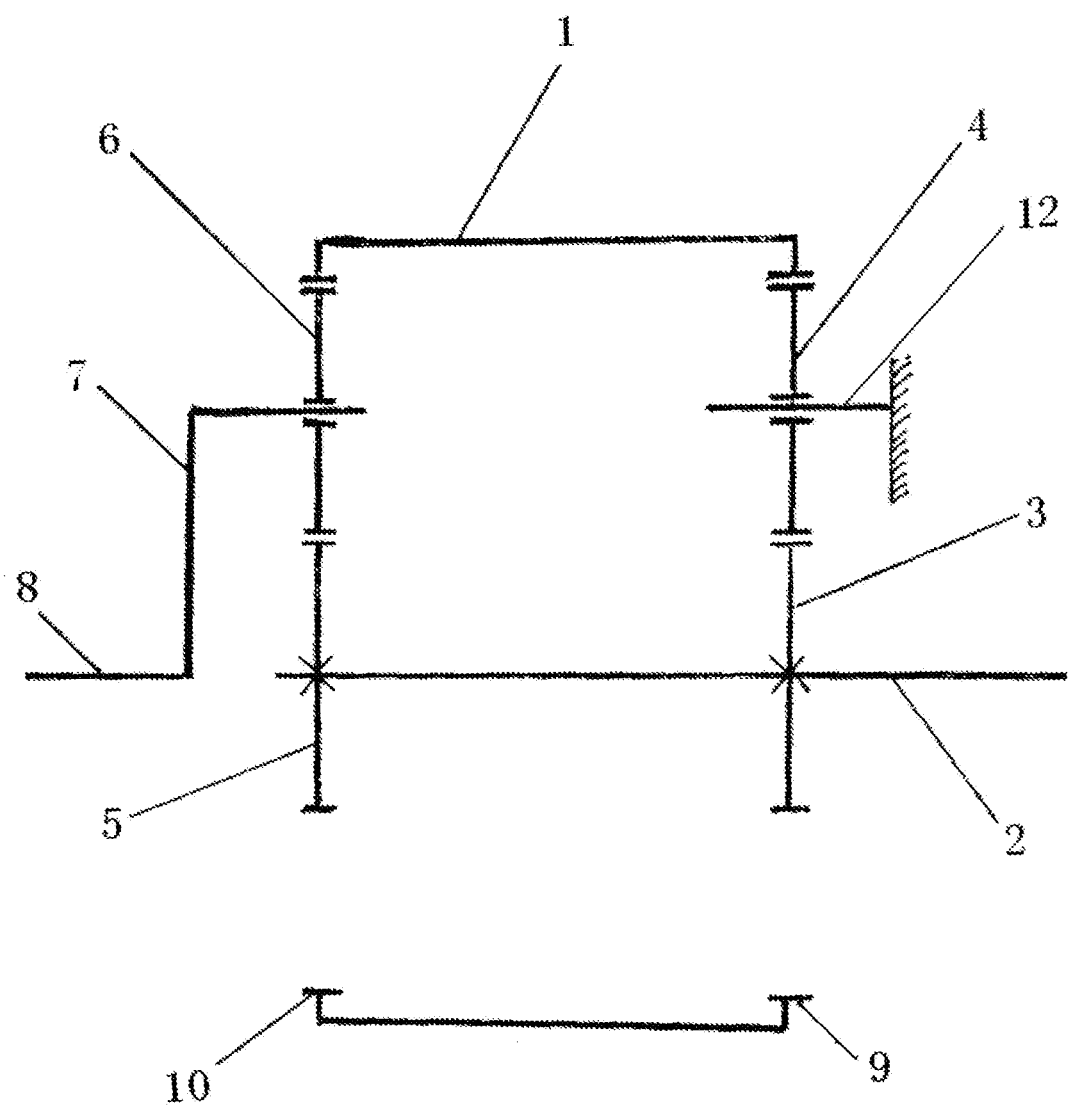
FIG. 1 is a structural schematic view of the suspended wheel reducer according to one embodiment of the present invention.

REFERENCE NUMERALS 1 suspended wheel
2 power input shaft
3 front sun wheel
4 front planetary wheel
5 rear sun gear
6 rear planetary wheel
7 connecting tie rod
8 power output shaft
9 front inner gear ring
10 rear inner gear ring
11 a plurality of sets of output gear wheels
12 Fixed rotating shaft
13 input gear wheel
14 a front inner gear ring

DETAILED DESCRIPTION

The characteristics of the suspended wheel reducer of the present invention will be further described in detail in the following with reference to FIGS. 1 and 2. For the purpose of clarity and simplicity, the same and similar parts in different embodiments will be indicated using identical reference numerals.

According to one embodiment of the present invention, the suspended wheel reducer shown in FIG. 1 creates, based the traditional planetary wheel configuration, a reducer configuration which is more advanced than the transmission principle of the "Cycloidal Pinwheel Reducer", "Harmonic gear Reducer", "Three-ring Reducer" and similar gear boxes, and comprises a front planetary gear train, a rear planetary gear train and a suspended wheel 1, the front planetary gear train is composed of a front sun wheel 3, a front planetary wheel 4 and a front inner gear ring 9, the rear planetary gear train is composed of a rear sun wheel 5, a rear planetary wheel 6 and a rear inner gear ring 10, the front inner gear ring 9 and the rear inner gear ring 10 are shaped at the inner peripheral surface of the suspended wheel 1 and molded integrally with the suspended wheel 1, the wheel center of the front sun wheel 3 and the wheel center of the rear sun wheel 5 are rigidly coupled with each other through a power input shaft 2, the front sun wheel 3 is transmissively coupled with the front inner gear ring 9 through the front planetary wheel 4, and the rear sun wheel 5 is transmissively coupled with the rear inner gear ring 10 through the rear planetary wheel 6, a connecting tie rod 7 for the power output shaft 8 is provided at the wheel center of the rear planetary wheel 6, and the front planetary wheel 4 rotates around the fixed rotating shaft 12.

The suspended wheel 1 herein is integrally molded with a front inner gear ring 9 and a rear inner gear ring 10 at its inner peripheral surface, the front inner gear ring 12 and rear inner gear ring 13 are preferably rigid inner gear rings. According to the structural design of the suspended wheel reducer of the present invention, through the front inner gear ring 9 and rear inner gear ring 10 integrally molded with the suspended wheel 1, the suspended wheel 1 may suspended at the design position without any support, i.e., the suspended wheel 1 will move with load at the peripheries of the front planetary wheel 4 and rear planetary wheel 6, and is thus called "suspended wheel".

The suspended wheel reducer according to the present invention provides a novel gear transmission configuration, which allows for optional different reduction ratios by different dimensional design of the front, rear planetary gear trains and the suspended wheel. The suspended wheel reducer has simple configuration, higher reliability, thus overcoming the drawback in prior art, in which a transmission mechanism for multilevel gear shift is required to achieve greater reduction ratio, reducing its overall dimensions and cost.

In the suspended wheel reducer according to the present invention, the pitch circles of the front sun wheel and rear sun gear have identical dimensions, and/or the pitch circles of the front planetary wheel and rear planetary wheel, and/or the pitch circles of the front inner gear ring and rear inner gear ring may be designed to be identical or distinct. FIG. 1 illustrates an example in which the above pitch circles have identical dimensions.

When the pitch circles of the front sun wheel and the rear sun wheel have different dimensions, the ratio thereof may be 1.0001~1000:1 or 1:1.0001~1000.

When the pitch circles of the front planetary wheel and the rear planetary wheel have different dimensions, the ratio thereof may be 1.0001~1000:1 or 1:1.0001~1000.

When the pitch circles of the front inner gear ring and the rear inner gear ring have different dimensions, the ratio thereof is 1.0001~1000:1 or 1:1.0001~1000.

By arrangement of the dimension of the pitch circles of the front sun wheel and rear sun gear, the dimension of the pitch circles of the front planetary wheel and rear planetary wheel as well as the dimension of the pitch circles of the front inner gear ring and rear inner gear ring, it's possible to make fore and aft two sets of planetary gear trains to have different running speeds based on the required reduction ratio, such that its possible to achieve diversified variation for the rotating speed of the power input shaft and the power output shaft, so as to obtain a reducer providing different reduction ratios.

Generally, the number of the front planetary wheel and/or the rear planetary wheel is three. But the number thereof may also be more than 3, for example, 4, and in consideration of the space assigned to the planetary wheels, the number of the front planetary wheel and/or rear planetary wheel is generally not more than 4, but at least 1. The number for the front planetary wheel and the number for the rear planetary wheel may be same and also may be distinct.

For the purpose of limiting the axial motion of the suspended wheel, the teeth for the front, rear planetary wheels and the corresponding front, rear inner gear rings are skewed teeth, and the skewed teeth for the front, rear planetary wheels and the corresponding front, rear inner gear rings have opposite handedness. The skewed tooth would apply axial force on the shaft when being engaged, and the skewed teeth having opposite handedness apply forces counteracting with each other on the shaft when being engaged respectively, thus limiting the axial motion of the suspended wheel.

To limit the axial motion of the suspended wheel, the teeth for the front, rear planetary wheels and the corresponding front, rear inner gear rings are herringbone teeth. For the reasons similar to that of the skewed tooth, the herringbone tooth also limit the axial motion of the suspended wheel.

The suspended wheel may also be equipped with a sliding bearing or rolling bearing for preventing its axial movement, so as to limit the axial motion of the suspended wheel. Specifically, the sliding bearing or rolling bearing may be assembled onto the outer periphery of the suspended wheel, things may also be that a part of the inner peripheral surface of the suspended wheel extends radially toward the power input shaft and the sliding bearing or rolling bearing are assembled between the power input shaft and the radially extending part of the suspended wheel, so as to limit the axial motion of the suspended wheel. Naturally, it's also possible for the sliding bearing or rolling bearing to be assembled onto the suspended wheel at any position where it's possible to limit the axial movement of the suspended wheel.

According to the suspended wheel reducer shown in FIG. 1, when the front sun wheel 3 and the rear sun gear 5, the front planetary wheel 4 and the rear planetary wheel 6 as well as the front inner gear ring 9 and the rear inner gear ring 10 have the same size, the rotating speed of the power output shaft 8 would be zero regardless of the rotating speed of the power input shaft 2 of the suspended wheel reducer. By altering the size of one set of the gear wheels in the front, rear planetary gear trains (the front, rear sun gears, the front, rear planetary wheels, the front, rear inner gear rings) so that the front planetary wheel and the rear planetary gear train have different running speeds, its possible to work out a reducer of different reduction ratio. The more the running speeds of the front planetary gear train and rear planetary gear train are similar to each other, the greater the reduction ratio and the torque of the suspended wheel reducer are; while the more the running speeds of the front planetary gear train and rear planetary gear train are different from each other, the less the reduction ratio of the suspended wheel reducer is, and the torque is also decreased correspondingly. In prior art, when various traditional reducers desire to increase reduction ratio on the basis of original configuration, such an object of increasing the reduction ratio can only be achieved through increasing the quantity of the gear wheels, shafts of the reducer, and altering and enlarging the gear box and similar parts so as to create a two or more stage configuration. However, the suspended wheel reducer provided by the present invention can obtain a reducer of optional reduction ratios, such as 30:1 . . . , 300:1 . . . , 3000:1 . . . , 10000:1 . . . , by means of the limited number of gear wheels and shafts in the front planetary gear train and rear planetary gear train. Further, the gear wheels, shafts and similar parts used in the suspended wheel reducer are mechanical structural elements proven during almost centennial production and practice, therefore, the suspended wheel reducer of the present invention obtains fantastic improvement at many aspects, such as the whole set performance, reliability, modularization of the production standard, the simplification and light weight of the whole set configuration, the standardization of the production process and maintainability and so on.

Figure 2:
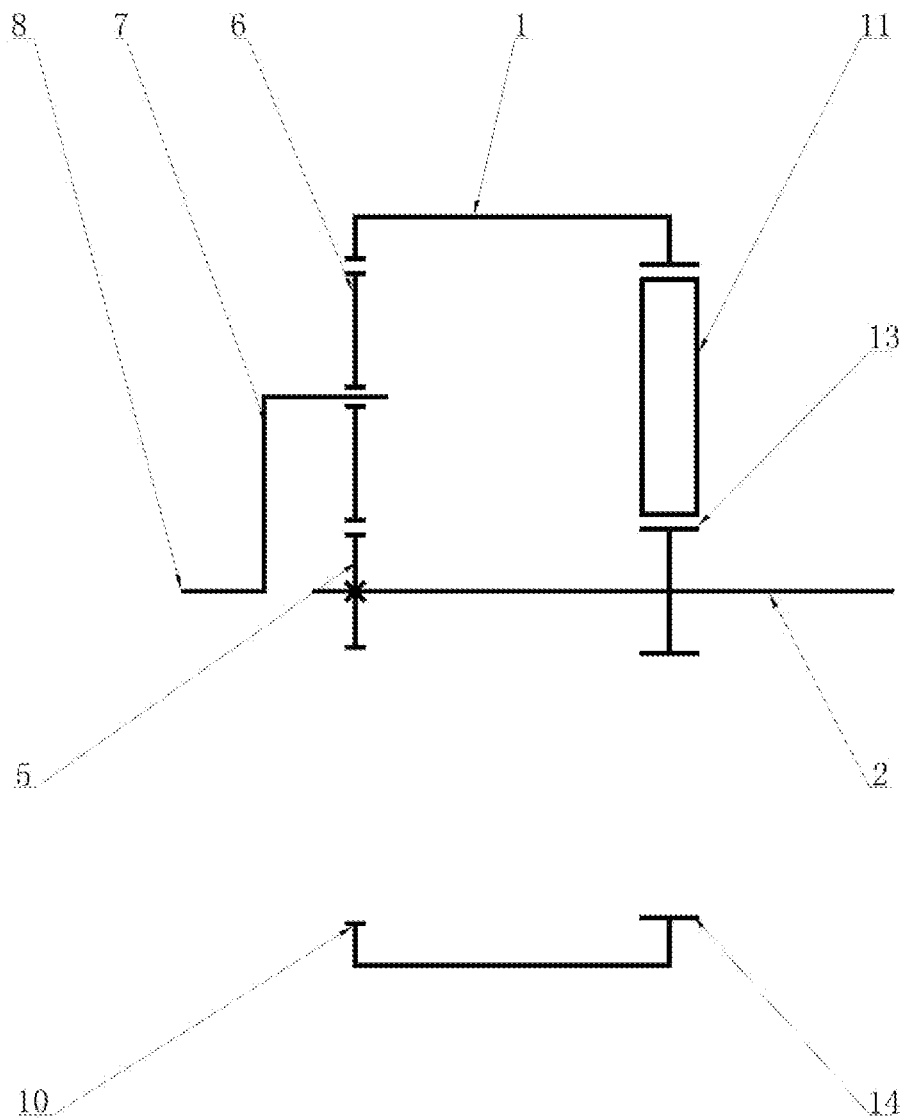
FIG. 2 is a structural schematic view of the suspended wheel crossing-zero multilevel transmission according to another embodiment of the present invention.

According to another embodiment of the present invention, there provides a suspended wheel crossing-zero multilevel transmission as shown in FIG. 2, comprising a front planetary gear train, a rear planetary gear train and a suspended wheel 1, the front planetary gear train is composed of one multilevel gear shift mechanism which has a configuration identical to that of the gear shift mechanism in prior art, the rear planetary gear train is composed of a rear sun wheel 5, a rear planetary wheel 6 and a rear inner gear ring 10, the rear inner gear ring 10 is shaped at the inner peripheral surface of the suspended wheel 1 and molded integrally with the suspended wheel 1, the multilevel gear shift mechanism comprises one input gear wheel 13, a plurality of sets of output gear wheels 11 and a front inner gear ring 14, the input gear wheel 13 engages with one set of the plurality of sets of the output gear wheels 11, the input gear wheel 13 is transmissively coupled with the front inner gear ring 14 through the set of the output gear wheel 11, and the rear sun wheel 5 is transmissively coupled with the rear inner gear ring 10 through the rear planetary wheel 6, the wheel centers of the rear sun wheel 5 and the input gear wheel 13 are rigidly coupled with the power input shaft 2, and a connecting tie rod 7 for connecting with the power output shaft 8 is provided at the wheel center of the rear planetary wheel 6, the reduction ratio of one set of the plurality of sets of output gear wheels to the input gear wheel 13 is identical to that of the rear planetary wheel 6 to the sun wheel.

In this embodiment, the multilevel gear shift mechanism is a gear shift mechanism of 3~30 levels.

In this embodiment, the reduction ratio of one set of the plurality of sets of output gear wheels to the input gear wheel and the reduction ratio of the rear planetary wheel to the sun wheel may have a ratio of 1.0001~1000:1 or 1:1.0001~1000.

With the suspended wheel crossing-zero multilevel transmission according to the present invention, it's provided for such an effect that the output rotating speed of the power output shaft is zero regardless of the input rotating speed of the power input shaft, and such an effect may be achieved when the input gear wheel is engaged with the output gear wheel of the set of the plurality of sets of output gear wheels the reduction ratio of which to the input gear wheel is identical to the reduction ratio of the rear planetary wheel to the rear sun gear. When the input gear wheel engages other sets of the output gear wheels, different reduction ratios can be achieved for the entirety of the suspended wheel crossing-zero multilevel transmission, which also comprise the advantaged similar to that of the suspended wheel reducer according to the first embodiment of the present invention, detailed description thereof is omitted here.

Based on the suspended wheel reducer shown in FIG. 1, the suspended wheel crossing-zero multilevel transmission shown in FIG. 2 is designed by replacing the front planetary gear train of the power input shaft 2 with an entirely mechanical multilevel gear shift mechanism 11, that is to say, the front planetary gear train is composed of one multilevel gear shift mechanism 11. When the input gear wheel is engaged with the output gear wheel of the set of the plurality sets of output gear wheels the reduction ratio of which to the input gear wheel is identical to the reduction ratio of the rear planetary wheel to the rear sun gear, it's possible to achieve zero rotating speed of the power output shaft 8, and when the input gear wheel engages with other set of the gear wheels, it's possible to achieve different reduction ratios for the suspended wheel crossing-zero multilevel transmission.

Due to being wholly composed of conventional mechanical gear wheels etc., the suspended wheel crossing-zero multilevel transmission could transmit greater torque and has higher reliability, which differs from the conventional mechanical transmission, for example, the gearbox for the vehicles features that, during the running of the machinery, it's possible for the gearbox to be shifted from the Forward gear to the Reverse gear through the neutral gear. Such a function can not be achieved with the gearbox in conventional vehicles, which can only be shifted from the Forward gear to the Reverse gear when the vehicle does not go forward and stops steadily.

Further, when such a multilevel gear shift mechanism 11 is designed to be a stepless speed-shifting mechanism controlled by such as mechanics or hydraulics etc., the present invention may be derived into a "suspended wheel stepless crossing-zero transmission", which has a wider speed adjustable range and facilitates the automatic control of electromechanical integration, although the torque transmitted by which is less than that by the multilevel crossing-zero transmission.

Further, in the two types of suspended wheel reducers shown in FIG. 1 and FIG. 2, if the power input shaft 2 and the power output shaft 8 are swapped in their functions, that is, the power input shaft 2 is used as the power output shaft while the power output shaft 8 is taken as the power input shaft, the present invention may provide an increaser which also comprises the various advantages regarding velocity ratio regulation possessed by the reducers shown in FIGS. 1 and 2.

The variations made by the skilled in this art based on the idea of the embodiment of present invention about particular embodiments and the range of application should not be construed as departing from the protective scope of the present invention, any modification within the protective scope of the claims fall into the protective scope of the present invention, and in general, the content of this specification should not be regarded as limiting to the present invention.

What is claimed is:

1. A suspended wheel crossing-zero multilevel transmission, comprising:
    a front planetary gear train including one multilevel gear shift mechanism;
    a rear planetary gear train including a rear sun wheel, a rear planetary wheel and a rear inner gear ring; and
    a suspended wheel,
    wherein
    the rear inner gear ring is shaped at an inner peripheral surface of the suspended wheel and integral with the suspended wheel,
    the multilevel gear shift mechanism includes:
        one input gear wheel,
        a plurality of sets of output gear wheels, and
        a front inner gear ring,
    the input gear wheel engages with one set of the plurality of sets of the output gear wheels,
    the input gear wheel is transmissively coupled with the front inner gear ring through said one set of the output gear wheels,
    the rear sun wheel is transmissively coupled with the rear inner gear ring through the rear planetary wheel,
    a wheel center of the rear sun wheel and a wheel center of the input gear wheel are rigidly coupled with a power input shaft,
    a wheel center of the rear planetary wheel is coupled with a power output shaft for outputting power,
    a reduction ratio of one set of the plurality of sets of output gear wheels to the input gear wheel is identical to a reduction ratio of the rear planetary wheel to the rear sun wheel.

2. The suspended wheel crossing-zero multilevel transmission according to claim 1, further comprising
    a connecting tie rod connected to the power output shaft and provided at the wheel center of the rear planetary wheel.

3. The suspended wheel crossing-zero multilevel transmission according to claim 1, wherein the multilevel gear shift mechanism is a gear shift mechanism of 3~30 levels.

4. The suspended wheel crossing-zero multilevel transmission according to claim 1, wherein the reduction ratio of one set of the plurality of sets of the output gear wheels to the input gear wheel and a reduction ratio of the rear planetary wheel to the rear sun wheel have a ratio of 1.0001~1000:1 or 1:1.0001~1000.

* * * * *